United States Patent
Ramsden

(10) Patent No.: US 10,253,453 B2
(45) Date of Patent: Apr. 9, 2019

(54) CURVED ACRYLIC DECORATED ARTICLE

(71) Applicant: Conde Systems, Inc., Mobile, AL (US)

(72) Inventor: Paul Andrew Ramsden, Lewiston, ME (US)

(73) Assignee: Conde Systems, Inc., Mobile, AL (US)

( * ) Notice: Subject to any disclaimer, the term of this patent is extended or adjusted under 35 U.S.C. 154(b) by 163 days.

(21) Appl. No.: 15/014,855

(22) Filed: Feb. 3, 2016

(65) Prior Publication Data

US 2016/0222583 A1 Aug. 4, 2016

Related U.S. Application Data

(60) Provisional application No. 62/112,119, filed on Feb. 4, 2015, provisional application No. 62/112,114, filed on Feb. 4, 2015.

(51) Int. Cl.

| | |
|---|---|
| *D06P 5/00* | (2006.01) |
| *B41M 5/52* | (2006.01) |
| *B32B 37/02* | (2006.01) |
| *B32B 37/06* | (2006.01) |
| *B32B 37/08* | (2006.01) |
| *B32B 37/10* | (2006.01) |
| *B32B 38/18* | (2006.01) |
| *C08J 7/04* | (2006.01) |
| *B41M 5/035* | (2006.01) |
| *B32B 38/14* | (2006.01) |
| *D06P 5/28* | (2006.01) |
| *B32B 37/00* | (2006.01) |
| *B32B 38/00* | (2006.01) |

(52) U.S. Cl.
CPC ............ *D06P 5/004* (2013.01); *B32B 37/025* (2013.01); *B32B 37/06* (2013.01); *B32B 37/08* (2013.01); *B32B 37/10* (2013.01); *B32B 38/1866* (2013.01); *B41M 5/035* (2013.01); *B41M 5/5281* (2013.01); *C08J 7/04* (2013.01); *D06P 5/002* (2013.01); *B32B 38/145* (2013.01); *B32B 2309/02* (2013.01); *B32B 2309/04* (2013.01); *B32B 2309/105* (2013.01); *B32B 2309/12* (2013.01); *B32B 2451/00* (2013.01); *B41M 5/5218* (2013.01); *D06P 5/005* (2013.01)

(58) Field of Classification Search
CPC ....... D06P 5/004; D06P 5/002; B41M 5/5281; B32B 37/025; B32B 37/06; B32B 37/08; B32B 37/10; B32B 38/1866; B32B 38/145; B32B 2451/00; B32B 2309/02; B32B 2309/04; B32B 2309/105; B32B 2309/12; C08J 7/04

See application file for complete search history.

(56) References Cited

U.S. PATENT DOCUMENTS

| | | | | |
|---|---|---|---|---|
| 4,059,471 A | * | 11/1977 | Haigh | ............... B29C 49/52 101/34 |
| 5,654,036 A | * | 8/1997 | Sugiura | ............... B44C 1/1712 427/264 |

* cited by examiner

*Primary Examiner* — Amina S Khan

(74) *Attorney, Agent, or Firm* — The Gache Law Firm, P.C.; Russell C. Gache

(57) ABSTRACT

A curved acrylic photographic article and a process for the making same comprising an optically clear acrylic layer and an adjacent synthetic organic polymer containing both light scattering particulates and diffused disperse dyes are described. The layered article being thermodynamically formed into a curved or other shape immediately subsequent to receiving a graphic decoration by dye diffusion thermal transfer.

17 Claims, 7 Drawing Sheets

CURVED ACRYLIC DECORATED ARTICLE

This application claims the benefit of filing priority under 35 U.S.C. § 119 and 37 C.F.R. § 1.78 of the U.S. Provisional Application Ser. No. 62/112,114 filed Feb. 4, 2015, for a Thermal Transfer Printed Polymeric Phone Case Insert, and U.S. Provisional Application Ser. No. 62/112,119 filed Feb. 4, 2015, for a Curved Acrylic Photo. All information disclosed in those prior provisional applications is incorporated herein by reference.

FIELD OF THE INVENTION

The present invention relates generally to dye sublimation transfer printing onto synthetic organic polymers and polymeric articles. In greater particularity, the invention relates to the production of a curved acrylic panel decorated by dye-sublimation.

BACKGROUND OF THE INVENTION

In the field of imprinting design onto articles of manufacturer using dye-sublimation, images are transferred from a carrier medium using heat and pressure to activate the printed dyes, causing them to turn gaseous through sublimation from their solid state and to subsequently diffuse into a softened polymer matrix under the influence of heat and pressure. For example, an early patent disclosing a dye sublimation transfer was presented in U.S. Pat. No. 4,021,591 issued to Devries. Another sublimation example is shown in a method of imaging a ceramic mug as disclosed in U.S. Pat. No. 4,943,684 issued to Kramer.

Certain fibrous materials such as polyester fabric and certain synthetic organic polymers such as acetyl, polycarbonate, and nylon can accept the diffusion of sublimable or disperse dyes directly and have no need to be coated before receiving the image. However, their natural ability to accept the diffusion of the dye does not ensure long term persistence of these dyes and often the image will blur or fade over time.

For this reason, and to render articles suitable for dye sublimation decoration on persistent, long-term hosts, synthetic organic coatings are typically formulated and employed to pre-coat the substrate being decorated prior to the transfer of the image. An example patent disclosing such coatings used prior to the sublimation of images onto ceramic tiles is U.S. Pat. No. 4,174,250 issued to Durand.

One article that uses a transferred image by a process of dye-sublimation is acrylic blocks. The thickness of these acrylic blocks is typically around 1" in order to position the block in a stable fashion without an additional base and for easy viewing of any decorations that might be applied to the block, such as photographs. Due to the ease at which larger panels can be knocked over, these blocks have been available in dimensions of up to 8"×10". Panels with a thickness of greater than 1" are not generally decorated due to high cost.

One advantage of acrylic blocks is that its flat, polished edge forms a reflective plane within the block and causes an appealing optical effect. Another advantage is that the acrylic can be fabricated from "sheet-stock" on a just-in-time inventory basis where the larger coated sheet can be cut down as needed into various sizes immediately prior to shipping a decorated product.

However, a disadvantage of acrylic articles is that a one inch thick acrylic is not only expensive but heavy, and the stability of a 1 inch base limits the potential height of an acrylic article. Thinner acrylic panels can be offered as a solution, however they require a stand to support them and the thinner they are more the susceptible to warping during manufacturing. Adding weights to maintain a flat shape during manufacturing can be used, but such weights can lead to surface damage of the acrylic.

In response, another article that has become popular in recent years for decorating—curved glass media. Curved glass is transparent and has a coating applied onto the outer side of the curve allowing an image to be viewed through the glass. Also, current techniques and formulations allow for images to be viewed from both sides. Hence, glass media have become popular for gifts and photo displays, and often are decorated for such uses.

The advantage of utilizing glass is that the glass can be curved eliminating the need for a base, and glass does not require a significant thickness with thicknesses of 0.1875" typical. Moreover, glass can be formed into a curved shape and can therefore act as its own support on a flat surface, thereby not requiring an independent stand like a thin acrylic article might require. Other advantages include the ability for coated curved glass to be heated without warping.

However, some disadvantages to curved glass exist, namely a relatively high weight, the potential for easy breakage, and safety concerns in a home environment, especially when young children are present. Maintaining a just-in-time inventory is also challenging for manufactures due to uncertain shipping times from international suppliers of glass blanks. Custom decorators must therefore invest in sizable inventories of each size if they are to be able to respond to rapid surges in demand, such as during holiday seasons or during popular photo demands, which further exposes the manufacture to risk if excess product inventory remains unsold.

Hence, both glass and acrylic articles each have their own advantages and disadvantages. However, curved glass has an additional factor which limits its acceptance in the marketplace. Curved glass experiences a much longer time to transfer a dye-sublimation image onto the glass article. The transfer of an image by dye-sublimation typically requires 7-12 minutes per image depending upon the process employed the thickness of glass, and coating composition. Acrylic does not suffer from this limitation. Therefore, it would be desirable to use acrylic as a gift article if the acrylic could be curved like glass, but also be susceptible to the application of a dye-sublimation image in the curved shape in a relatively rapid manufacturing process.

SUMMARY OF THE INVENTION

In summary, the invention comprises a process for applying a dye sublimation image to a curved plate of acrylic in a commercially reasonable time period. The process yields a curved acrylic photographic media comprising of an optically clear acrylic layer and an adjacent synthetic organic polymer containing both light scattering particulate and diffused disperse dyes. The layered article being formed into a curve or other shape immediately subsequent to receiving a graphic decoration by dye diffusion thermal transfer.

Other features and objects and advantages of the present invention will become apparent from a reading of the following description as well as a study of the appended drawings.

BRIEF DESCRIPTION OF THE DRAWINGS

An invention incorporating the features of the invention is depicted in the attached drawings which form a portion of the disclosure and wherein.

\*\* Applicant notes that all cross sectional views of the herein depicted portions of the invention are not drawn to scale in the horizontal direction. \*\*

DESCRIPTION OF THE PREFERRED EMBODIMENTS

Figure 1:
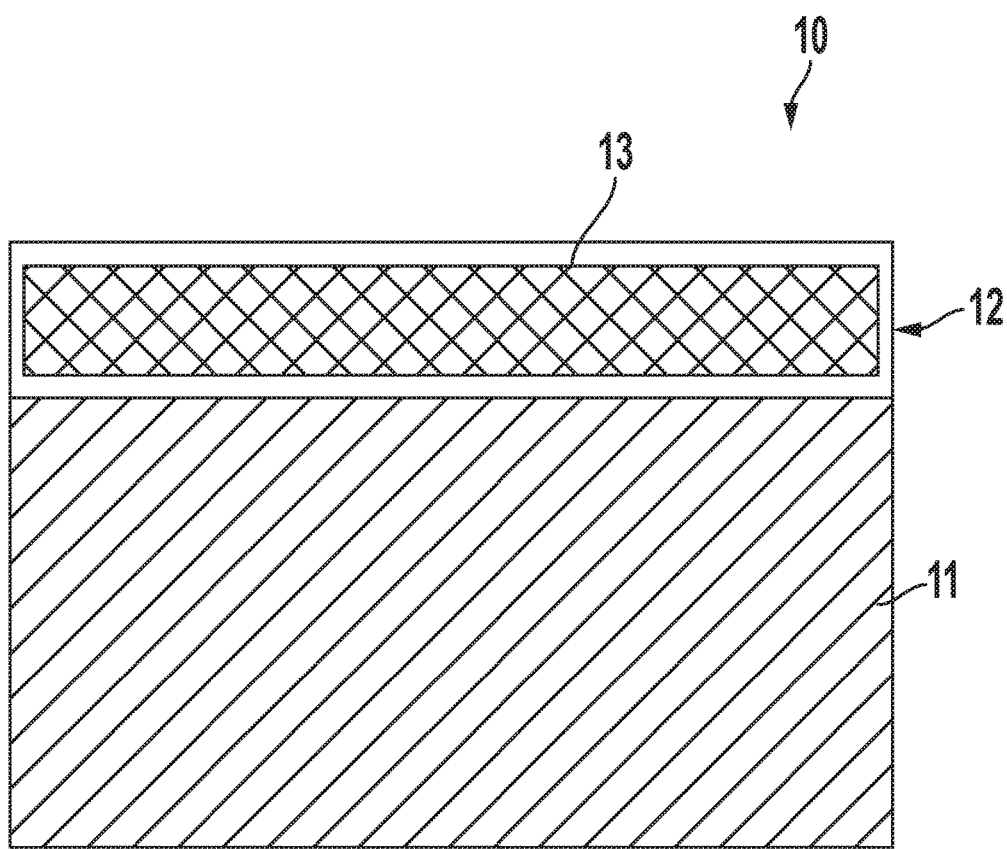
FIG. 1 is a cross sectional diagram of a coated acrylic substrate.

Referring to the drawings for a better understanding of the function and structure of the invention, FIG. 1 shows a cross sectional view 10 of a 0.177" acrylic substrate 11 coated with a synthetic organic polymer 12 applied thereon. Acrylic substrate 11 is an optically clear thermoplastic such as cell cast or extruded acrylic, or polycarbonate. The substrate must be capable of being thermoformed and be of high optical clarity. The organic polymer 12 is a clear acrylic urethane coating modified by the addition of a light scattering pigment 13 that renders it a white translucent, partially opaque coating. The light scattering pigment 13 includes nano-sized particles of titanium dioxide having an average particle size of 100 nm at a loading level of 20% by weight of solids. The coating 12 is applied by spraying onto the acrylic 11 resulting in a dry film buildup of 0.004". In the preferred embodiment, the coating dries at room temperate with a catalyzed reaction to induce polymerization.

Coating 12 must be capable of bonding with the acrylic substrate 11, but possess sufficient flexibility to allow the coated article to be formed into a curved shape while heated. Suitable coating bases are acrylic or urethane, or a hybrid mixture of both. The coating should either be extruded directly onto the product or applied by conventional coating deposition procedures such as spraying, curtain deposition, or a flow-over deposition. The coating may be cured either by low temperature thermal activation, or the application of a chemical catalyst, which is preferred. The coating 12 ideally is not cured by photo-initiated or electron-beam initiated reaction because polymers cured in this manner generally do not possess the ability to be heated and shape-formed after curing without cracking or delamination.

Coating 12 also includes light scattering additives 13. For a final decorated article to exhibit the desired optical characteristics the coating must include particulate that is capable of scattering light, as opposed to reflecting the light. Suitable light scattering particulates include aluminum oxide, titanium dioxide, zirconium oxide, calcium carbonate, kaolin clay, ceramic nanoparticles, cerium oxide and other white appearance particulate. Importantly, each particulate must be less than 400 nm in size so that each is smaller than any visible wavelength of light. This results in the particulate having a higher refractive index than the clear coating that supports the particles, resulting in suitable light scattering. Also the particulate should be white in color, and also renders the acrylic more scratch resistance. In the preferred embodiment the particle additive is nano-particles of aluminum oxide. The loading level of the particulate should be sufficient to impart whiteness and a degree of opacity, but not of such concentrations that the coating ceases to be translucent or partially transparent. Therefore, nanoparticles in a range of 60 nm-200 nm at a loading level of between 10% and 30% by weight of solids of the coating are preferred.

Coating thickness is also important. The coating 12 must be thick enough to allow the light attenuation caused by the particulate contained within it to render the article white and to allow the dyes, in concert with the particulate, to render a degree of opacity. This generally requires a coating thickness of at least 0.0015", but preferably greater than 0.0025" in thickness. The coating should not however be greater than 0.005" because as disperse dyes may fail to properly diffuse through the coating. The consequence of this is that the whiteness imparted by the particulate present between the acrylic interface and the threshold of the dye saturated part of the coating film causes a hazing of the image when viewed from non-coated side of the acrylic substrate. Therefore the optimal thickness of the coating is between 0.003" and 0.0045".

Figure 2:
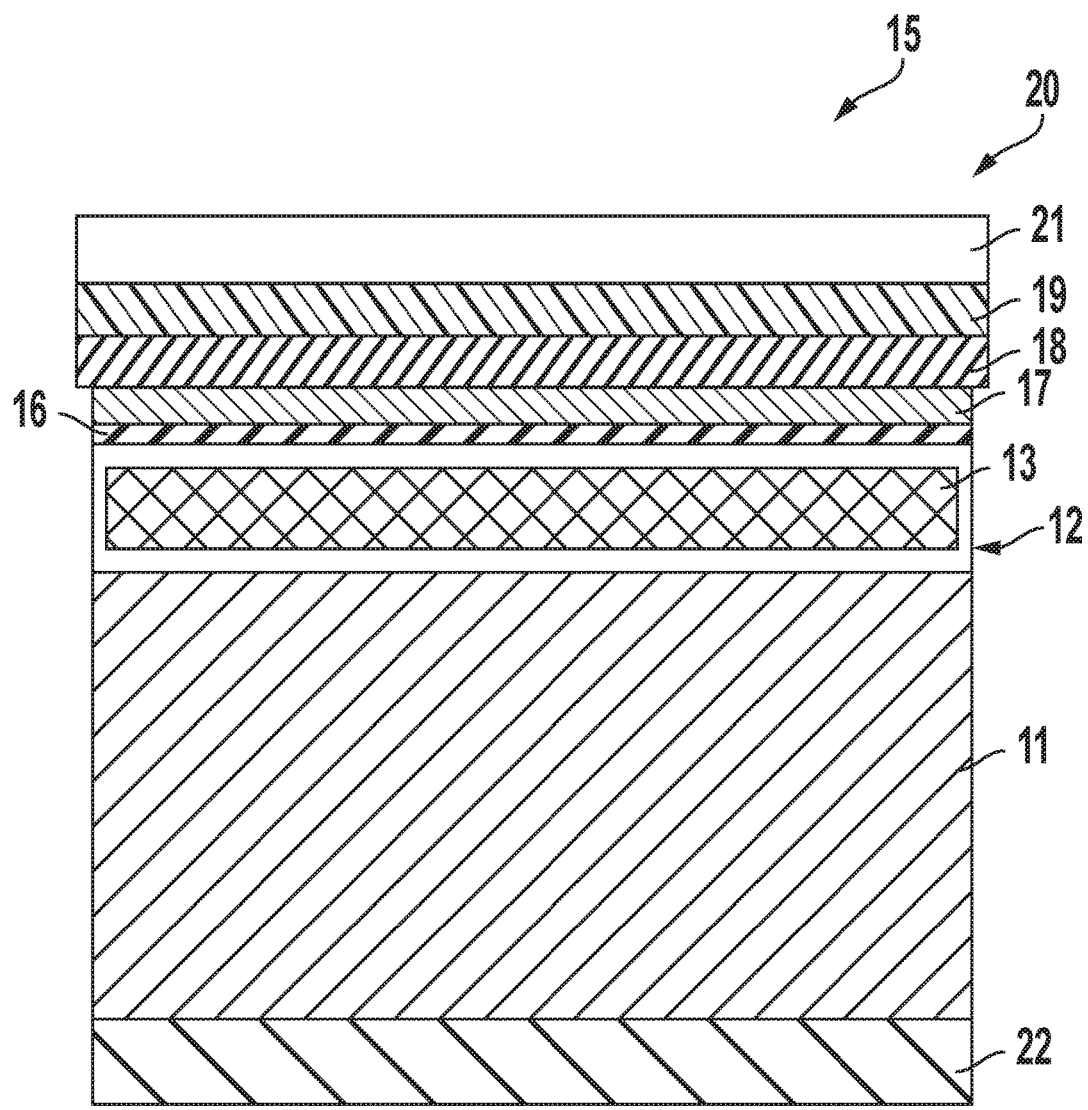
FIG. 2 is a cross sectional diagram of the coated substrate shown in FIG. 1 positioned within a heat press in the process of receiving a dye sublimation image from a transfer media.

Referring now to FIG. 2 is may be seen the coated acrylic piece 10 from FIG. 1 now positioned in an arrangement 15 within a heat press 20 prepared to receive the transfer of a graphic image 16 from a printed transfer paper media 17. The layering from the top of the stack of elements depicted in this cross sectional view includes a steel heat platen 19 heated to 365 degrees F., a porous PTFE coated Fiberglass sheet 18 to protect the platen 19 and provide for a breathable interface between the platen 19 and the transfer paper 17. Below the breather liner 18 is transfer paper 17 having an image 16 printed thereon with disperse dyes that may be deposited via a suitable inkjet printer. The paper is oriented with print side facing downward against the coated side 12 of the coated substrate 11 as described in FIG. 1. The substrate 11 is supported by a porous ceramic insulation layer 22 which prevents heat from dissipating from the acrylic below it. The ceramic insulation 22 furthermore allows for moisture of other gases to wick from the substrate 11 during the heating process.

Figure 3:
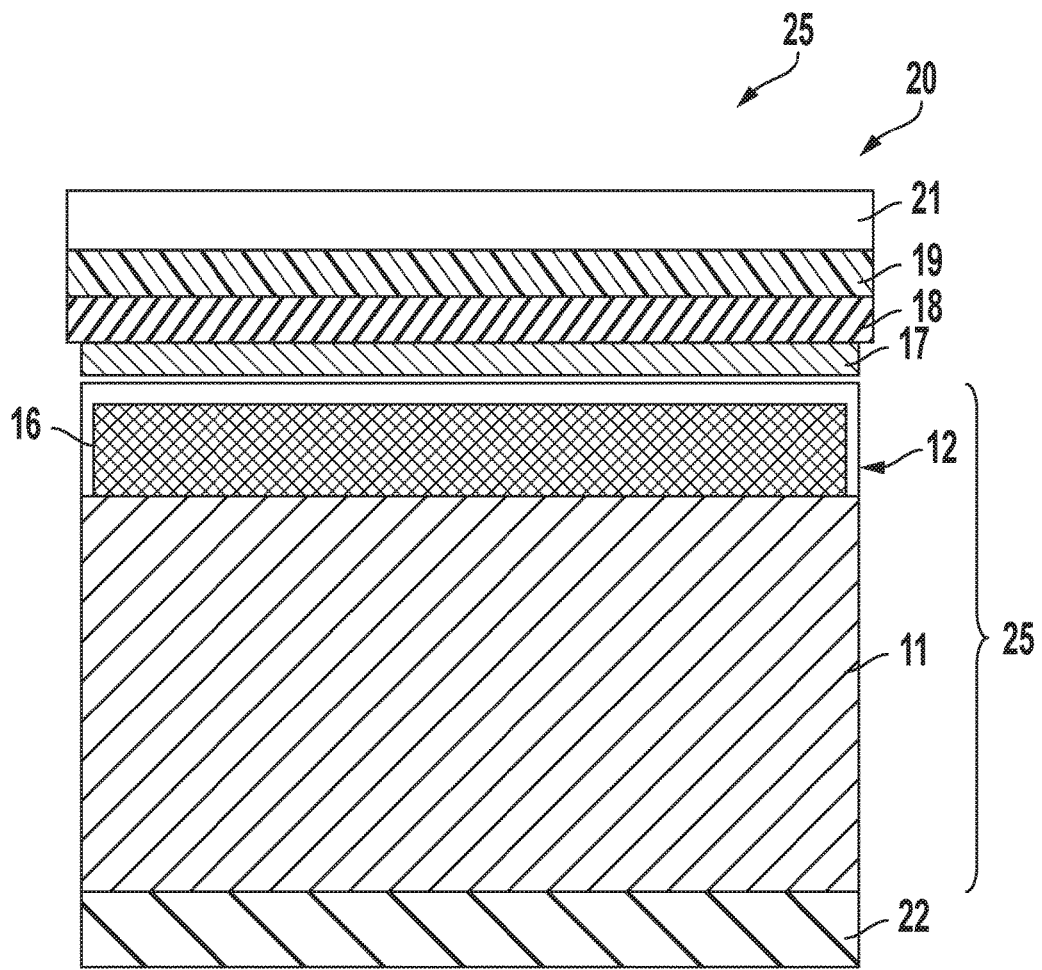
FIG. 3 is a cross sectional diagram of the coated substrate shown in FIG. 2 after heat and pressure have caused the diffusion of the dye into the polymer coating.

As shown in FIG. 3, disperse dyes 16 held by transfer paper 17 have turned into gases by a sublimation phase change process and have diffused into the receptive polymer coating 12 thoroughly until reaching the surface of acrylic substrate 11. This occurs after the assembly has been subject to 365 degrees F. for 2 minutes under a pressure of 20 PSI, and results in a decorated acrylic article 25 having a flat or planar shape when removed from the heat press 20.

Figure 4:
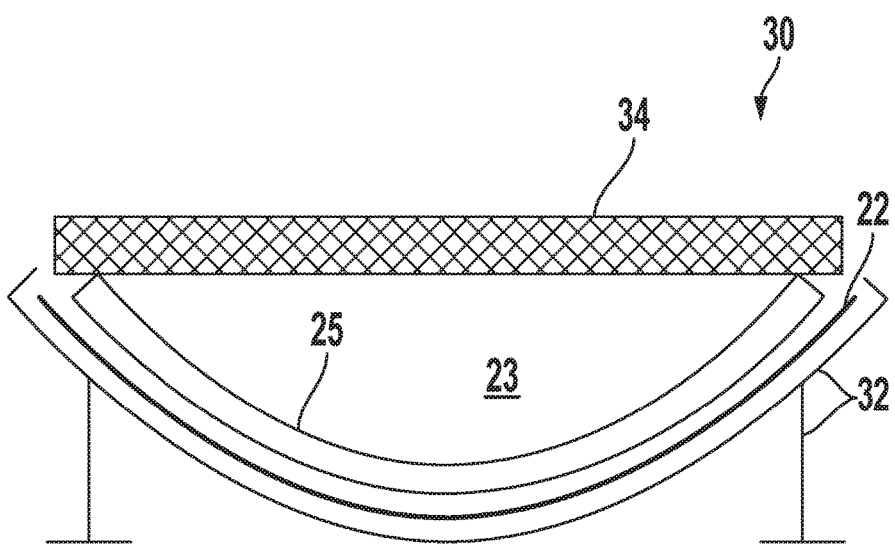
FIG. 4 is a diagrammatic view of the now decorated substrate placed into a curved jig to cause the acrylic substrate to curve under the influence of gravity.

Referring now to FIG. 4, it may be seen that article 25 has been removed from the heat press arrangement 15 following transfer of the image into the coating 12 and the now decorated article 25 has been placed on a curved metal jig 32 lined with a porous ceramic insulation 22 of the same nature as employed in the heat press arrangement 15. The article 25, being of a temperature well exceeding its softening point and having been exposed to sufficient heat to raise the entirety of it to a uniform temperature, is placed on and has been conformed to the shape of the metal jig 32 under the influence of gravity. A flat weight 34 comprising a piece of aluminum has been placed upon the acrylic article 25 in such a manner as to only touch the article 25 at its edges and with minimal weight applied to prevent the article 25 from warping as it cools. It is necessary to place a weight 34 on the cooling acrylic article 25 to prevent it from warping as it cools. The weight comprising a piece of metal such as aluminum sits on top of the acrylic and rests on each of the left and right edges of the acrylic as shown. If the weight 34 is too light it will not prevent the warping from taking place, but if it is too heavy it can damage the delicate edges of the heated article 25.

The jig 32 may be any metal material capable of being fabricated into a curve. Relatively thin aluminum sheet is ideal for the jig 32, but any metal material capable of being formed in a curved fashion is satisfactory. The jig has a radius equal to the radius desired for the finished acrylic article 25, and may be convex or concave in shape and include multiple curves as may be understood. However, the inventor has discovered that in the herein described process the acrylic article 25 generally should not include wave shapes that exceed 11 oscillations per 16 inches of lineal acrylic substrate to avoid damage. As shown, the jig is lined with a porous fabric or paper material 22 that acts as a liner to facilitate uniform cooling of the article 25 as heat is drawn out of the acrylic and into the ambient air above it. The material 22 also allows heated air to be pulled out of the acrylic via a gap 23 between the article surface and the weight as shown.

Figure 5:
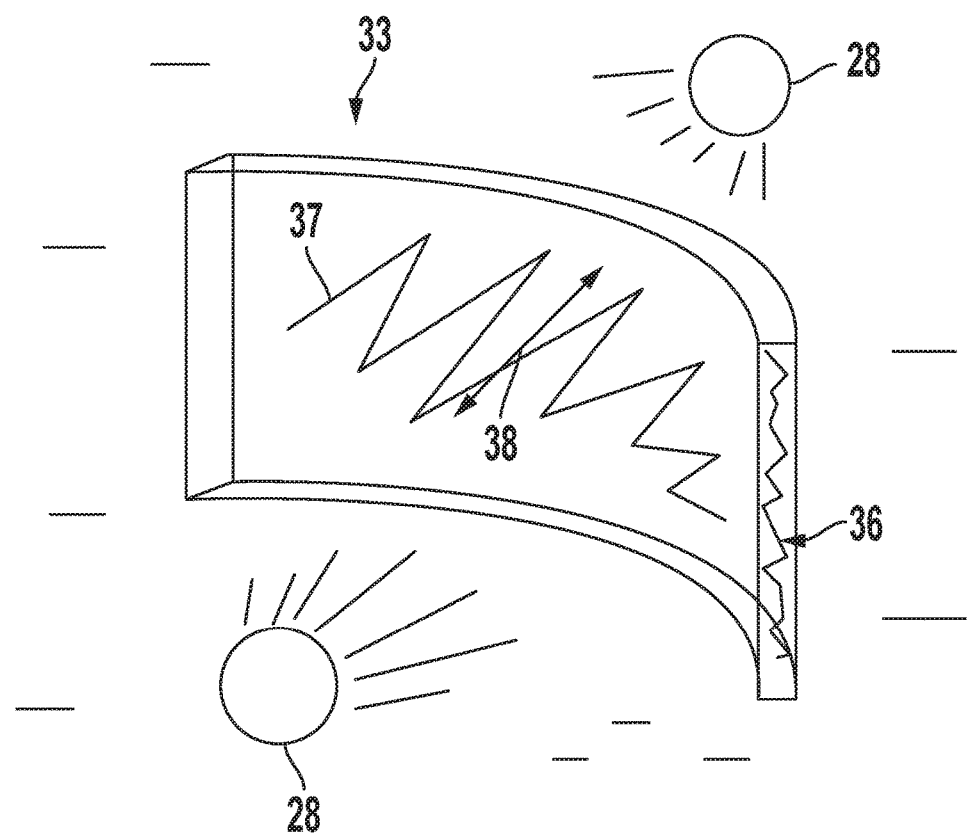
FIG. 5 is perspective diagram of the article showing how light illuminates the image deposited on the surface of the article.

FIG. 5 shows the article 33 now cooled into its curved shape and positioned on a flat surface in an upright position, as potentially on a table top surface. A light source 28 such as from ambient light in a lighted room shines onto the front and back of the article surface with the light being scattered 38 within the dyed polymer 37, thereby illuminating the image formed by the transferred dye. The edges 36 of the acrylic article 33 also reflect the light reflected from the image 37 providing a mirroring effect 36 when the article 33 is viewed from its side. Responsive to the type of particulate used within the coating and the loading of that particulate, the decorated article 33 is easily illuminated and the image discerned from either its front or back.

Figure 6:
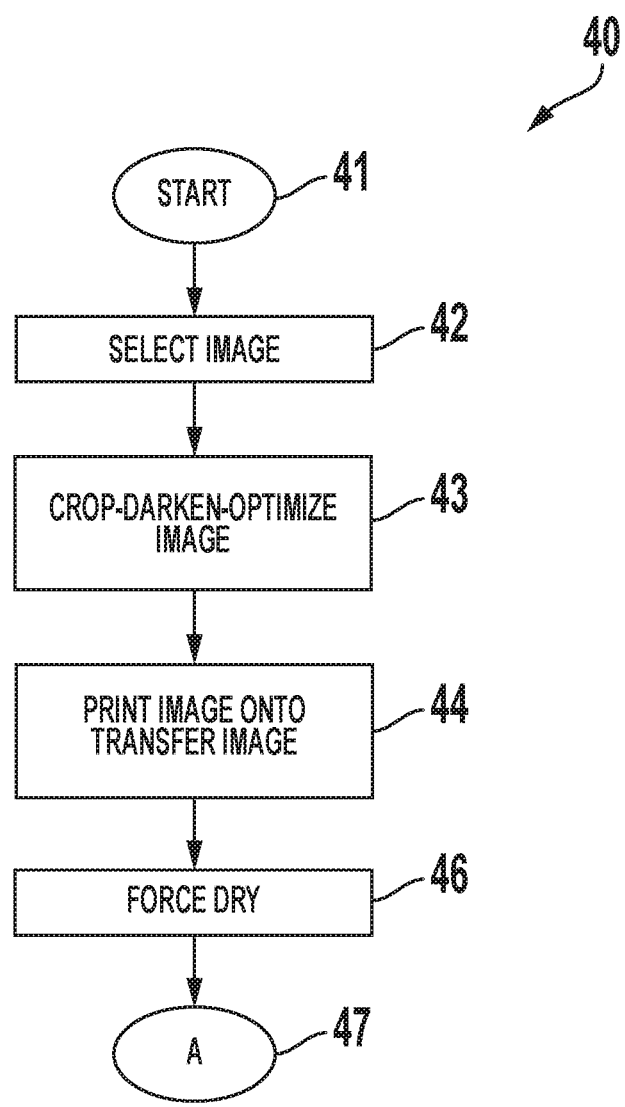
FIG. 6 is a process diagram showing the creation of a transfer media having a dye sublimation image formed thereon; and, FIG. 7 is a process diagram showing the manufacture of a curved acrylic article decorated with an image through dye sublimation.

Referring now to FIG. 6, it may be seen that the transfer media 17 with dispersible ink 16 shown in arrangement 15 of FIG. 2 includes a preparation process 40 to arrive at a suitable combination. After an image for printing is selected 42, a step of image optimization 43 is initiated to compensate for the dye sublimation process. In particular, what may seem to be an excellent image on the transfer media 17 likely will have characteristics too weak to result in an image in the decorated article due to it being washed out or insufficiently vibrant. This is because nano-composite particles in the translucent coating are milky or frosted in appearance which renders a seemingly well printed image washed out due to light scattering effects. Hence, additional and exaggerated brilliance/saturation, and some darkening, are necessary to compensate for the additional light scattering and to render an attractive image in the final imaged coating 12 (see FIG. 3).

Direct printing inks such as UV curable pigmented inks do not provide sufficient translucency, depth, and flexibility for the herein disclosed process. However, disperse dyes are satisfactory and the preferred colorants, and can be printed onto a paper or film transfer medium via an inkjet printer. As is known, disperse dyes sublimate when heated and diffuse into synthetic organic polymers, such as the coating 12 applied to the acrylic substrate 11.

The optimized image in step 43 is then printed using disperse dyes onto a transfer media (typically paper) 44, and then dried with forced air or convection heating. The transfer media and image are now ready for utilization in process 50 of FIG. 7 at insert point A 47.

Figure 7:
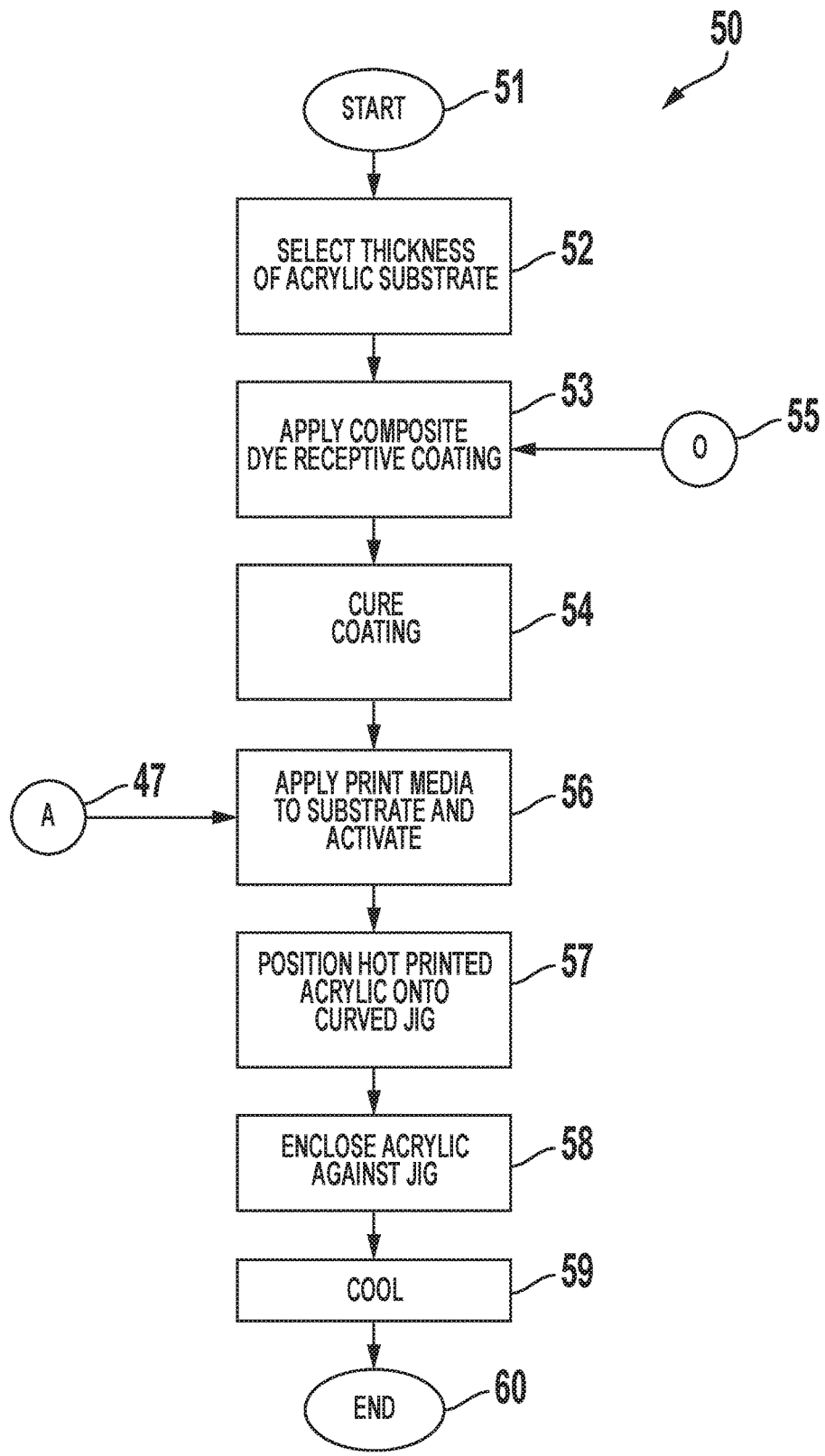

The process 50 shown in FIG. 7 is a manufacturing process to produce a decorated curved article 25 made of acrylic as displayed on a table top shown in FIG. 5. Initially, the thickness of the acrylic substrate is selected 52. The acrylic substrate is coated 53 with a synthetic organic polymer containing light scattering particulate 55 sufficient to render it white in appearance, while retaining a degree of translucence as discussed above. The coated acrylic substrate is then cured 54 and printed transfer media is applied 56 from source A 47 and placed in a heat press for activation.

Pursuant to the layered assembly 15 of FIG. 2, heat and pressure causes migration of the dyes 16 through sublimation and then diffusion into the adjacent polymer 12. The lower, uncoated side of the acrylic substrate 11 is preserved from damage during the heating cycle with an underlying porous ceramic insulation 22. Within the layering of assembly 15, PTFE coated fiberglass in thin sheets are used to protect the heat press platen 19 and to prevent items during compression such as consumables like tape from sticking to the platen 19. A porous sheet is preferred, and forms an upper layer 18 between the platen 19 and transfer paper 17 (see FIG. 2). Under the sheet 18 the printed transfer paper 17 with printed side of disperse ink 16 is positioned against the coated side 12 of the acrylic substrate 11. The uncoated side of the acrylic is therefore is positioned beneath and is supported by a porous, inorganic cloth 22. Heat press rubber or silicone matting are attached to an unheated fixed platen (not shown) beneath the insulating layer 22 to support the assembly 15. The insulation layer must be positioned above any silicone or rubber or foam pad on the platen, and the insulating layers 22 must be porous and not be susceptible to heating to avoid damage to the acrylic 11.

A correct combination of heat, pressure, and time is required to thoroughly transfer the disperse dyes into the coating while not damaging the acrylic substrate 11. The sublimation thermal transfer process requires an operating temperature significantly higher than the softening point of the acrylic. For acrylic to remain stable over time, and to maintain its appearance, the acrylic substrate must be heated uniformly over the entire substrate and in a single heating exposure (i.e. heated only once). Use of a commercially available heat press configuration shown in FIG. 2 with a heated platen 19 providing heat from above the substrate and a ceramic insulator below 22 provides a satisfactory environment to accomplish the heating cycle to transfer the dye into coating 12 while not damaging the substrate 11 below. The ceramic insulator below 22 is comprised of ceramic paper or other inorganic porous insulating media, such as glass fiber or woven ceramic. Ceramic paper can include the use of ⅛" ceramic paper as is commonly used in kiln firing or autoclave applications, or other heat stable porous materials and flame resistant materials such as Meta-Arimid™ materials such as Nomex™ by Dupont are also suitable. While organic porous, woven or fibrous materials were evaluated, inorganic materials possessed better heat stability and insulating properties and are preferred.

The combination of the insulating properties below and the relatively low heat conduction from the heated platen 19 above creates a suitable barrier to protect the acrylic while providing uniform heating. The acrylic substrate 11 is depressed into the ceramic cloth or fibrous media as the heating press 20 is lowered and pressed onto the materials of the assembly 15. Due to the porous nature of the insulating material 22, gases created by the heat of the assembly outgas, and any moisture or gas driven out of the acrylic substrate 11 during the heat press cycle is also wicked away by the porous insulator thus preventing surface damage. The exact heat, pressure and time to accomplish this varies according to the thickness of the acrylic, however tests conducted by the inventor indicate that an optimal temperature is 360-380 degrees F., with an optimal pressure of less than but approaching 40 PSI, but preferably within a range of 5-20 PSI. The amount of time to maintain this heat and pressure varies depending upon the thickness of the acrylic substrate, with a typical application time ranging from 1 minute for thicknesses of less than 0.1" and 2-2.5 minutes for thicknesses of greater than 0.1 to 0.2". Thicker panels of acrylic, such as 1" blocks require an application of at least 2-3 per process.

Upon saturation of the coating 12 by the disperse dyes, the acrylic substrate 11 is removed from the assembly 15 and immediately placed in its now formable condition into a jig shaped according to the desired shape of the decorated acrylic 57. The now decorated acrylic 25 under the influence of the heat energy absorbed in the heat press assembly 15, and the weight of the article under the pull of gravity conforms to the shape of the jig 32. The conformed, but still softened article is prevented from warping by being held down with a weighted platen 34 which encloses it against the jig 58. To prevent damage to the acrylic air flow is permitted above and below the article 25 with a gap between the platen 34 above and a porous liner 22 below (see FIG. 4). Once the acrylic cools to a temperature below its softening point, typically less than 200 degrees F., warping should not occur and the acrylic article can be removed from the jig and prepared for packaging or use. Cooling will typically take less than 5 minutes, but fan cooling may be utilized to decrease cooling time. Once cooled 59 to below a temperature that would permit it to warp, the decorated acrylic 25 is removed from the jig 32 and the process is deemed complete 60.

The present invention thus provides for a curved acrylic article to be produced with minimal process time, avoiding damage to the acrylic despite the operating temperature and pressure of the process, and prevents warping during cooling, thus overcoming obstacles that prior hereto have prevented such a product from being produced and marketed.

While I have shown my invention in one form, it will be obvious to those skilled in the art that it is not so limited but is susceptible of various changes and modifications without departing from the spirit thereof.

Having set forth the nature of the invention, what is claimed is:

1. A method for making a curved plastic article, comprising the steps of:
   a. preparing a transfer media sheet having disperse dyes applied thereon and formed into a human discernable image;
   b. preparing a mixture of urethane polymer and light scattering particles, wherein said light scattering particles comprise an average size of between 60 nm to 200 nm and are combined with said urethane at a loading level of between 10% and 30% by weight of solids;
   c. coating one side of a flat tile of acrylic with said polymer mixture to a thickness of at least 0.0015 inches and curing said same;
   d. compressing said transfer media sheet against said coated side of said acrylic tile under at least 5 PSI of pressure and at a temperature of at least 300 degrees Fahrenheit until said human discernable image is diffused into said coating;
   e. after said diffusion step, transferring said acrylic tile onto a jig formed into a shape approximating a desired final curved article shape so that gravity conforms at least a portion of said acrylic tile into the curved shape of said jig; and,
   f. cooling said now curved acrylic tile to room temperature.

2. The method as recited in claim 1, further including the step of placing a substantially flat weight over said acrylic tile and said jig to prevent warping of said tile while cooling.

3. The method as recited in claim 2, wherein said step of preparing said transfer media comprises the steps of;
   a. selecting an image for transfer;
   b. optimizing the appearance of said image for dye sublimation transfer;
   c. printing said optimized image onto said transfer media with dyes suitable for sublimation transfer from said transfer media at a later time; and,
   d. drying said transfer media.

4. A method for making a curved plastic article, comprising the steps of:
   a. selecting a size and thickness of a plastic substrate;
   b. applying a light scattering, dye receptive composite coating to at least one side of said plastic substrate;
   c. curing said dye receptive coating;
   d. positioning a transfer media having a disperse dye deposited thereon adjacent to said dye receptive coating;
   e. causing the dye sublimation transfer of said dye from said transfer media into said dye receptive coating through the application of heat and pressure;
   f. while said plastic substrate is still softened from said step of applying heat and pressure, placing said plastic substrate onto a jig and molding said plastic substrate into a curved shape; and,
   g. allowing said plastic substrate to cool.

5. The method as recited in claim 4, wherein said step of curving said still softened plastic substrate in a jig comprises the steps of:
   a. placing said still softened substrate onto a jig having a shape matching a final shape desirable for said plastic article;
   b. positioning a porous insulating material between said jib and said softened substrate; and,
   c. positioning said jig and said insulting material such that gravity deforms said softened substrate into said desirable final article shape.

6. The method as recited in claim 5, further comprising the steps of:
   a. prior to said step of applying a dye receptive coating, combining an organic polymer with nano-sized, light scattering particles to form said light scattering, dye receptive composite coating.

7. The method as recited in claim 6, wherein said step of causing the dye sublimation transfer of said dye from said transfer media into said dye receptive coating comprises the steps of:
   a. placing a breathable liner on a side of said transfer media opposite from said dye receptive coating;
   b. supporting said plastic substrate on a side opposite from said positioned transfer media with a layer of porous insulation; and,
   c. enclosing a layered material assembly of said breathable liner, transfer media and dye, said coated substrate, and said porous insulation in a heat press for the application of heat and pressure to said layered material assembly.

8. The method as recited in claim 7, further comprising prior to said step of positioning said transfer media the steps of;
   a. selecting an image for transfer;
   b. optimizing the appearance of said image for dye sublimation transfer;
   c. printing said optimized image onto said transfer media with dyes suitable for sublimation transfer from said transfer media at a later time; and,
   d. drying said transfer media.

9. The method as recited in claim 4, further comprising the steps of:
   a. prior to said step of applying a dye receptive coating, combining an organic polymer with nano-sized, light scattering particles to form said light scattering, dye receptive composite coating.

10. The method as recited in claim 9, wherein said step of applying heat and pressure comprises;
   a. applying a temperature of between 360 and 380 degrees Fahrenheit; and,
   b. simultaneously applying a pressure of between 5 and 40 PSI.

11. The method as recited in claim 10, wherein said dye on said transfer media comprises a human discernable photograph.

12. The method as recited in claim 11, wherein said resulting curved plastic article is self-standing.

13. The method as recited in claim 12, wherein said plastic substrate comprises acrylic.

14. The method as recited in claim 4, wherein dye receptive composite coating comprises a clear acrylic urethane coating modified by the addition of a light scattering pigment of titanium dioxide having an average particle size of 100 nm at a loading level of 20% by weight of solids.

15. The method as recited in claim 4, further comprising prior to said step of positioning said transfer media the steps of;
   a. selecting an image for transfer;
   b. optimizing the appearance of said image for dye sublimation transfer;
   c. printing said optimized image onto said transfer media with dyes suitable for sublimation transfer from said transfer media at a later time; and,
   d. drying said transfer media.

16. The method as recited in claim 4, wherein said step of curving said still plastic substrate, comprises the steps of:
   a. placing said still softened substrate into a jig having a shape matching a final shape desirable for said plastic article;
   b. positioning a porous insulating material between said jib and said softened substrate;
   c. positioning said jig and said insulting material such that gravity deforms said softened substrate into said desirable final article shape; and,
   d. placing a substantially flat weight over said plastic substrate and said jig to prevent warping of said substrate while cooling.

17. The method as recited in claim 16, wherein said step of applying heat and pressure comprises;
   a. applying a temperature of between 360 and 380 degrees Fahrenheit; and,
   b. simultaneously applying a pressure of between 5 and 40 PSI.

* * * * *